United States Patent [19]
Fuchsberger

[11] Patent Number: 5,233,413
[45] Date of Patent: Aug. 3, 1993

[54] ELECTRONIC IMAGE PROCESSING WITH AUTOMATIC COLOR CORRECTION

[75] Inventor: Hermann Fuchsberger, Ismaning, Fed. Rep. of Germany

[73] Assignee: Agfa-Gevaert Aktiengesellschaft, Leverkusen, Fed. Rep. of Germany

[21] Appl. No.: 639,826

[22] Filed: Jan. 9, 1991

[30] Foreign Application Priority Data

Jan. 26, 1990 [DE] Fed. Rep. of Germany ....... 4002298

[51] Int. Cl.⁵ .............................................. H04N 1/46
[52] U.S. Cl. ......................................... 358/80; 358/75
[58] Field of Search ...................... 358/80.75; 395/131

[56] References Cited

U.S. PATENT DOCUMENTS

| | | | |
|---|---|---|---|
| 4,812,902 | 3/1989 | Fuchsberger | 358/80 |
| 5,077,604 | 12/1991 | Kivolowitz et al. | 358/80 |
| 5,109,274 | 4/1992 | Washio et al. | 358/80 |
| 5,121,199 | 6/1992 | Aoki | 358/80 |

Primary Examiner—Edward L. Coles, Sr.
Assistant Examiner—Jill Jackson
Attorney, Agent, or Firm—Peter K. Kontler

[57] ABSTRACT

A colored original is scanned point-by-point and density values are generated for each point in the primary colors red, green and blue. The points are divided into groups and the density values for each primary color are averaged over the respective groups. The averaged density values for each group are transformed into a set of converted values including a luminance value as well as first and second chrominance values. The range spanned by the luminance values is divided into segments and each set is assigned to a respective segment. The sets are classified as color dominant or color nondominant by comparing the saturation value of each set with a threshold value. For each, segment the first and second chrominance values of the nondominant sets are respectively added to yield first and second sums. The first and second sums are shifted relative to the gray point to generate corrected first and second sums. Each pair of uncorrected first and second sums is converted into uncorrected red, green and blue density values whereas corrected density values are obtained from the corresponding pair of corrected first and second sums. For each primary color, the corresponding uncorrected and corrected density values define a point in a coordinate system of uncorrected density versus corrected density. By plotting the points from the various segments, a correction curve can be established for each primary color.

20 Claims, 2 Drawing Sheets

ELECTRONIC IMAGE PROCESSING WITH AUTOMATIC COLOR CORRECTION

BACKGROUND OF THE INVENTION

The invention relates generally to the preparation of an image of an original.

More particularly, the invention relates to the automatic correction of color casts during electronic image processing.

In the automatic correction of color casts, an original is electrooptically scanned in the three primary colors at a multiplicity of points arranged in a series of columns and rows. The resulting density signals are averaged over groups of the points to yield a reduced number of average density signals which represent an image of decreased resolution. The average density signals are subsequently transformed into chrominance signals, i.e., color difference signals, and luminance signals in such a manner that a luminance signal and a pair of chrominance signals are associated with each group of points.

Electronic image processing using color correction circuits is being increasingly employed for the reproduction of colored originals (positive-positive) and for the production of colored photographic positives from colored negatives. See, for example, the West German Publication No. 36 29 469 and the literature cited therein. As noted above, the original is scanned at a multiplicity of points defining a series of columns and rows. Scanning of the original normally occurs serially in the three primary colors red, green and blue. The resulting electrical signals, which represent an image of the original, are then modified or corrected in accordance with specific criteria. As a rule, the signals are digitized and can thereafter be temporarily stored in digital memories. The modified signals are sent to a color exposure unit, e.g., a CRT scanner-printer system, which operates on points of the image serially. The exposure unit converts the electrical signals into an optical image and recording material such as, for instance, color negative paper, is subsequently exposed to the image. It is noteworthy that the optical image is produced point-by-point through transformation of the electrical image signals.

Transformation into luminance and chrominance signals is known from the video art. Here, color corrections are performed by electronic means where there are aberrations in color, e.g., color casts, resulting from photography or where color falsification occurs during transfer and must be compensated for.

In the production of color photographic images using a color image reproduction system, undesired deviations in color are conventionally compensated for by adjusting the average value of the color vectors of all image points to the standard gray point. To this end, a color balance regulator is provided in practice and functions to effect a shift in color vector, for example, by increasing the amplification in one or two color channels. It is also possible to produce predetermined deviations from the standard gray point when the motif of the original makes this desirable, e.g., green lawns or red evening sky. Since an average is taken over the entire image, only overall compensation for or correction of color deviations or color casts can be achieved. Frequently, however, different color casts are present in areas of an image having different luminances. Thus, in strongly illuminated portions of an image, there can be a shift towards red (a red cast), for instance, while more weakly illuminated portions have a cyan cast. This type of appearance is referred to as "color imbalance". Such color casts cannot be compensated for with the above-described, overall color balance adjustment or regulation.

SUMMARY OF THE INVENTION

It is an object of the invention to provide a method which enables the quality of an image to be improved.

Another object of the invention is to provide a method which makes it possible to more effectively compensate for color casts in an image.

An additional object of the invention is to provide a method which allows the coloration of an image to be improved in such a manner during electronic image processing that color casts of all types are automatically compensated for or eliminated throughout the image even when the luminance varies.

A further object of the invention is to provide an apparatus which enables the quality of an image to be improved.

It is also an object of the invention to provide an apparatus which makes it possible to more effectively compensate for color casts in an image.

Still another object of the invention is to provide an apparatus containing circuitry which allows the coloration of an image to be improved in such a manner during electronic image processing that color casts of all types are automatically compensated for or eliminated throughout the image even when the luminance varies.

The preceding objects, as well as others which will become apparent as the description proceeds, are achieved by the invention.

One aspect of the invention resides in a method of preparing an image of an original. The method involves scanning the original in each of the primary colors red, green and blue, and generating a luminance value for each of a multiplicity of regions of the original based on the scanning step. The luminance values span a predetermined range and this range is divided into a plurality of segments so that different ones of the luminance values lie within different segments. The regions of the original having luminance values within the segments are classified as color dominant or color nondominant. At least one second value is calculated for each of selected segments and the calculations include assigning different weights to dominant and nondominant regions in such a manner that the second value for each selected segment represents an overall color cast for the regions of the respective segment. Each of the second values is adjusted with reference to the gray point to generate a respective adjusted third value and a correction plot for each of the primary colors is established based on the pairs of second and third values.

The method of the invention permits automatic correction of color casts during electronic image processing.

The scanning step may be carried out electrooptically and scanning of the original may be performed at a multiplicity of points which define a series of N columns and M rows. The generating step may then include generating red, green and blue density values for each point, dividing the points into groups each of which corresponds to one of the above regions of the original, and respectively averaging the red, green and blue density values for each of the groups to derive average red, green and blue density values for each region. The points may be divided into a series of n columns and m rows per group where n is smaller than N and m is smaller than M. Each column of a group may contain j points and each row k points so that n=N/j and m=M/k. The image represented by the average red, green and blue density values has lower resolution than the image represented by the initial red, green and blue density values.

The generating step may further comprise converting the average red, green and blue density values for each group into first and second chrominance values, i.e., color difference values, and a luminance value. Each segment of the luminance range containing a luminance value is then additionally associated with the two chrominance values corresponding to such luminance value.

The step of classifying various regions of the original as color dominants or color nondominants may include determining a regional color saturation value each region and employing a threshold value with each of the values. This preferably involves a comparison of each saturation value with a threshold value.

The step of calculating at least one second value for each selected segment may comprise generating first and second sums for each selected segment. The first sum for each selected segment is obtained by adding the first chrominance values of the respective regions susceptible to color casts whereas the second sum is obtained by adding the second chrominance values of these regions. The first and second sums may accordingly be considered to represent overall chrominance values for the different regions of the respective segments.

The step of adjusting the second values may be performed using the gray equivalence principle. Thus, the adjusting step may involve shifting the first and second sums towards the gray point. If the first sum for the ith selected segment is represented by $U_i$ and the second sum by $V_i$, this can be expressed mathematically as $$U_i + \Delta U_i = 0 \quad (1)$$

and $$V_i + \Delta V_i = 0 \quad (2)$$

where $\Delta U_i$ shift in $U_i$ and $\Delta V_i$ denotes the shift in $V_i$.

Alternatively, the adjusting step may include shifting the first and second sums towards a predetermined color or color temperature which deviates from the gray point. This can be expressed mathematically as $$U_i + \Delta U_i = U_{gi} \quad (3)$$

and $$V_i + \Delta V_i = V_{gi} \quad (4)$$

where $U_{gi}$ and $V_{gi}$ are the chrominance values for the new color.

The shifted sums constitute adjusted overall chrominance values for the respective segments. These adjusted overall chrominance values represent the original overall chrominance values as compensated for color casts.

The method may further comprise the step of converting the unadjusted overall chrominance values, i.e., the unshifted first and second sums, for each selected segment, together with the corresponding luminance value, into unshifted red, green and blue density values constituting unadjusted overall density values for the regions of the respective segment. Similarly, the adjusted overall chrominance values for each selected segment, together with the associated luminance value, may be converted into shifted red, green and blue density values constituting adjusted overall density values for the regions of the corresponding segment. The adjusted overall red, green and blue density values respectively represent the unadjusted red, green and blue density values as compensated for color casts.

Each unadjusted overall density value for a given primary color has a corresponding adjusted overall density value. Thus, for the ith selected segment, there are three points $(R_i, R_i')$, $(G_i, G_i')$ and $(B_i, B_i')$ where $R_i, G_i, B_i$ respectively denote the unadjusted red, green and blue density values and $R_i', G_i', B_i'$ respectively denote the adjusted red, green and blue density values. The points for each primary color are plotted to yield a correction plot for the corresponding color, preferably in a Cartesian coordinate system. Accordingly, the points for the primary color red are used to establish a red correction plot $R_i' = f(R_i)$; the points for the primary color green are used to establish a green correction plot $G_i' = f(G_i)$; and the points for the primary color blue are used to establish a blue correction plot $B_i' = f(B_i)$. The plots may take the form of a series of connected straight line segments or of a monotonically increasing curve.

The data for constructing the correction plots may be stored and it is preferred to store the data for the different primary colors separately. To this end, a discrete memory may be provided for each plot. The memories may be erasable or reprogrammable and may, for instance, be in the form of look-up tables. The term "look-up table" is intended to denote a commercially available electronic component which can store a series of values in the form of a table.

The plots may be employed to derive correction factors for the red, green and blue density values generated during point-by-point scanning of the original. Thus, the red correction plot may be used to correct the red density values obtained upon point-by-point scanning of the original; the green correction plot may be used to correct the green density values obtained upon point-by-point scanning of the original; and the blue correction plot may be used to correct the blue density values obtained upon point-by-point scanning of the original.

The segments of the predetermined luminance range may have identical spans. Alternatively, the spans of the segments may increase with increasing luminance.

The operation of assigning different weights to dominant and nondominant regions, which is performed prior to addition of the chrominance values for the respective segments, may involve the assignment of less weight to the chrominance values of dominant regions than to the chrominance values of nondominant regions. The weight reductions may vary stepwise with degree of color dominance or can be based generally on distortion of the signals representing the chrominance values.

As mentioned previously, the dominant and nondominant regions are preferably distinguished from one another by determining regional color saturation values for the respective regions and comparing each saturation value with a threshold value. A different threshold value may be associated with each segment of the luminance range and the threshold values may increase monotonically with increasing luminance. These threshold values may be stored, e.g., in a look-up table.

As a first approximation, the threshold values advantageously obey a linear relationship. The dominant and nondominant regions are then distinguished from one another using the following criterium:

$$S_{ti} \leq k_0 + (k_1 \times Y_{pi}) \qquad (5)$$

Here, $S_{ti}$ denotes the threshold value for the ith segment, $Y_{pi}$ denotes the luminance value calculated for the ith segment, $k_0$ is a constant having a value between 10 and 20 and $k_1$ is a constant having a value between 0.05 and 0.15.

As indicated earlier, the color cast correction factors calculated for each of the primary colors in the various segments of the predetermined luminance range may be plotted in the form of a series of connected straight line segments. However, it is advantageous for such a plot to be smoothed using conventional mathematical algorithms so that a continuous, monotonically increasing curve is obtained for each correction plot.

Several advantages may be achieved by means of the invention. To begin with, the method of the invention makes it possible to automatically correct not only global or overall color casts in the color channels associated with the original but also color casts which relate to a particular color and differ in different luminance intervals. Depending on the circumstances, three different correction plots may be obtained for the three primary colors red, green and blue.

Furthermore, by appropriate selection of the constants $k_0$ and $k_1$ used to divide the regions of the original into color dominants and color nondominants, those color casts which have been found to frequently arise in the individual luminance intervals can be taken into account and corrected better than before.

Moreover, the method according to the invention can be modified by scanning a plurality of originals, e.g., different originals constituting part of the same scene, and subsequently using all of the resulting density signals to establish respective correction plots for the three color channels. These correction plots are then applicable to each of the originals.

Another aspect of the invention resides in an apparatus for preparing an image of an original. The apparatus comprises means for scanning the original in the three primary colors red, green and blue, and data processing means operatively associated with the scanning means. The processing means includes means for generating a predetermined range of luminance values by assigning a respective luminance value to each of a multiplicity of regions of the original; means for dividing the predetermined range into a plurality of segments such that different ones of the luminance values lie in different segments; means for classifying the regions having luminance values within the segments as color dominants or color nondominants; means for calculating at least one second value for each of selected segments by assigning different weights to dominant and nondominant regions in such a manner that each second value represents an overall color cast for the regions of the respective segment; means for adjusting each second value with reference to the gray point so as to generate a respective adjusted third value; and means for establishing a correction plot for each of the primary colors from the pairs of second and third values.

The apparatus preferably further comprises respective storage means for the different correction plots.

The apparatus of the invention can be used with advantage for the automatic correction of color casts during electronic image processing.

The novel features which are considered as characteristic of the invention are set forth in particular in the appended claims. However, the improved method of image preparation, as well as the construction and mode of operation of the improved apparatus for image preparation, together with additional features and advantages of the method and apparatus, will be best understood upon perusal of the following detailed description of certain specific embodiments when read in conjunction with the accompanying drawings.

DESCRIPTION OF THE PREFERRED EMBODIMENTS

Figure 1:
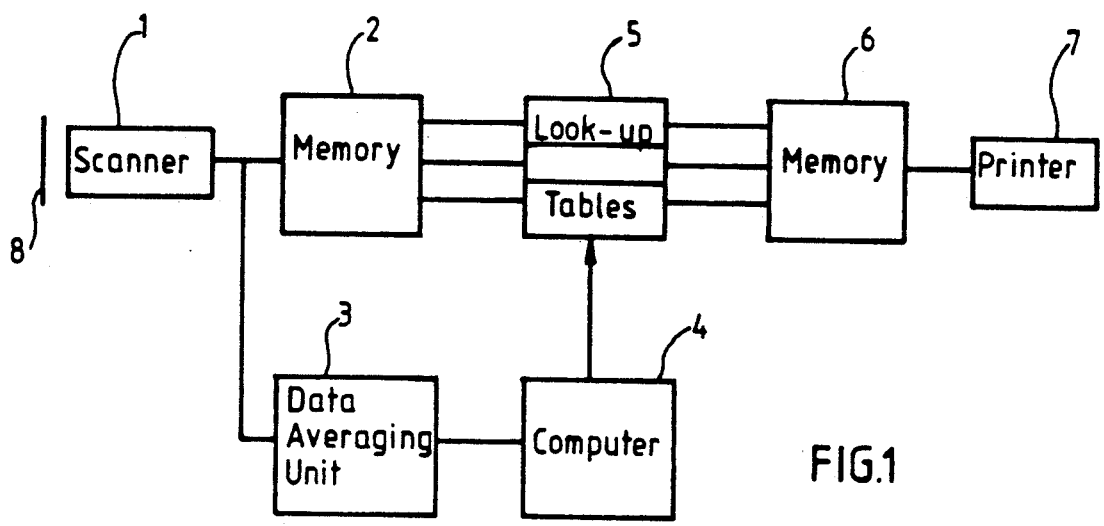
FIG. 1 is a block diagram of an apparatus according to the invention for preparing an image of an original.

FIG. 1 is a block diagram of an apparatus in accordance with the invention for preparing an image of an original. The apparatus is designed for electronic image processing and is capable of automatically correcting for color casts during such processing.

A scanner 1 electrooptically scans an original 8 point-by-point. The scanner 1 comprises a sensor in the form of a linear charge-coupled device, that is, a charge-coupled device having a series of sensing cells arranged in a row. The charge-coupled device is moved vertically over the surface of the original 8 at constant velocity so that the original 8 is scanned at a multiplicity of image points defining a series of M columns and N rows. The original 8 is scanned in each of the primary colors red, green and blue with scanning in these three primary colors being performed in succession. To this end, appropriate color filters are successively pivoted into the path of the light used for scanning. The scanner 1 generates an electrical imaging signal for each point and each primary color. Every imaging signal represents the density of the corresponding point in the respective primary color.

It is assumed here that each row consists of 1,024 image points (M=1,024) and that each column consists of 2,048 image points (N=2,048). Accordingly, the electrooptical image represented by the imaging signals is constituted by $N \times M = 2,048 \times 1,024$ image elements or pixels in each of the three primary colors red, green and blue.

The imaging signals obtained from the scanner 1, which are analog signals, are digitized in a non-illustrated analog-to-digital converter. The resulting stream of digitized imaging signals is divided between a memory 2 which stores the digitized imaging signals and a data averaging unit 3 which is arranged in parallel with the memory 2. The data averaging unit 3 functions to reduce the amount of data representing the electrooptical image derived from the scanner 1. Thus, the data averaging unit 3 divides the N×M original image points, or the N×M pixels in each primary color, into a plurality of groups each of which corresponds to a predetermined region of the original 8. The groups are formed in such a manner that the points or pixels of each group define a series of rows and columns. Each row may contain k points or pixels and each column j points or pixels where j is smaller than N and k is smaller than M. The groups and the corresponding regions of the original 8 then define a series of n rows and m columns such that n=N/j and m=M/k. Assuming that the original 8 was scanned at 2,048×1,204 image points and that each group contains 64 rows and 64 columns of points or pixels, the groups and the corresponding regions of the original 8 define a set of 32 rows and 16 columns.

For each group, the data averaging unit 3 averages the density values for each primary color to yield respective average red, green and blue density values. Consequently, the original electrooptical image represented by the N×M original density values per primary color is replaced by an image of lower resolution constituted by n×m average density values per primary color.

The average density values are sent to a computer 4 which transforms the average red, green and blue density values for each group into a luminance value $Y_p$ and two chrominance values $U_p$ and $V_p$ according to the following equations:

$$Y_p = 0.3R + 0.6G + 0.1B \tag{6}$$

$$U_p = B - Y_p \tag{7}$$

$$V_p = R - Y_p \tag{8}$$

where R denotes average red density, G denotes average green density and B denotes average blue density.

The luminance values obtained upon transformation span a predetermined luminance range. This range is divided into a preselected number, i, of adjoining segments or intervals $Y_i$, e.g., 32 segments or intervals. By dividing the entire range of luminance values into intervals $Y_i$ and arranging the latter so that neighboring intervals adjoin, it becomes possible to assign each luminance value $Y_p$ and its corresponding pair of chrominance values $U_p, V_p$ to one of the luminance intervals $Y_i$. In this manner, each group of points or pixels, and hence each predetermined region of the original 8, may be associated with a luminance interval $Y_i$. Thus, based on the respective luminance value $Y_p$, each set of luminance and chrominance values $Y_p, U_p, V_p$ is assigned to one of the luminance intervals $Y_i$ as follows:

$Y_p \rightarrow Y_{pi}$ $U_p \rightarrow U_{pi}$ $V_p \rightarrow V_{pi}$

The computer 4 now calculates the magnitude $S_{pi}$ of the color saturation vector for each group of points or pixels, i.e., for each predetermined region of the original 8, using the following equation:

$$S_{pi} = (U_{pi}^2 + V_{pi}^2)^{\frac{1}{2}} \tag{9}$$

The computer 4 next sorts or classifies each of the color saturation values $S_{pi}$ using a color saturation threshold value $S_{ti}$. The predetermined regions of the original 8 for which $S_{pi} > S_{ti}$ have a relatively high degree of color saturation. These regions constitute color dominant regions and are not considered when correcting for color casts because the gray equivalence principle does not apply to highly saturated colors. Moreover, experience has shown that a color cast does not have a disruptive influence on color dominant regions.

In contrast, color costs are very noticeable in regions of lower luminance, that is, color nondominant regions for which $S_{pi} \leq S_{ti}$. Accordingly, only those predetermined regions of the original 8 which are characterized by $S_{pi} \leq S_{ti}$ and thus constitute color nondominant regions are taken into account for image correction.

The threshold value $S_{ti}$ used to differentiate between color dominant and color nondominant regions is not a constant but differs for the i luminance intervals. Hence, the differentiating criteria $S_{pi} > S_{ti}$ and $S_{pi} \leq S_{ti}$ denote that the color saturation values $S_{pi}$ of the regions associated with the ith luminance interval are compared with the particular threshold value $S_{ti}$ for such interval.

During determination of the threshold values $S_{ti}$, it is taken into account that, for relatively small luminance values, regions of relatively low color saturation have a significant effect on color casts while, in contrast, regions of the same color saturation have practically no influence, or a much lesser degree of influence, on color casts at large luminance values. Coincident with this observation, the threshold values $S_{ti}$, which are established empirically, increase with increasing luminance value.

Furthermore, a shift relative to the gray point $U=0, V=0$ can be taken into consideration in determining the threshold values $S_{ti}$. Such a shift can be accounted for using the following equation:

$$S_{pi} = ([U_{pi} - U_{oi}]^2 + [V_{pi} - V_{oi}]^2)^{\frac{1}{2}} \tag{10}$$

Here, $U_{oi}$ and $V_{oi}$ denote an average color cast for the respective luminance interval and are calculated before correcting for color casts.

In practice, the threshold values $S_{ti}$ for the individual luminance intervals are loaded into a look-up table and then retrieved by the computer 4 upon classification of the predetermined regions of the original 8 into color dominant and color nondominant regions.

The sensitometric properties of the color photographic recording materials used for reproduction of the corrected images are also considered during determination of the threshold values $S_{ti}$.

A simplified method of calculating the threshold values $S_{ti}$ is based on the following linear relationship between $S_{ti}$ and luminance value Y:

$$S_{ti} = k_0 + (k_1 \times Y_i) \tag{11}$$

Here, $k_0$ is a constant having a value of $10 \leq k_0 \leq 20$ and $k_1$ is a constant having a value of $0.05 \leq k_1 \leq 0.15$. The precise values of $k_0$ and $k_1$ within the indicated ranges is determined in dependence upon the sensitometric properties of the color photographic recording materials.

In this approximation, the threshold values $S_{ti}$ thus increase in direct proportion to the luminance.

Figure 2:
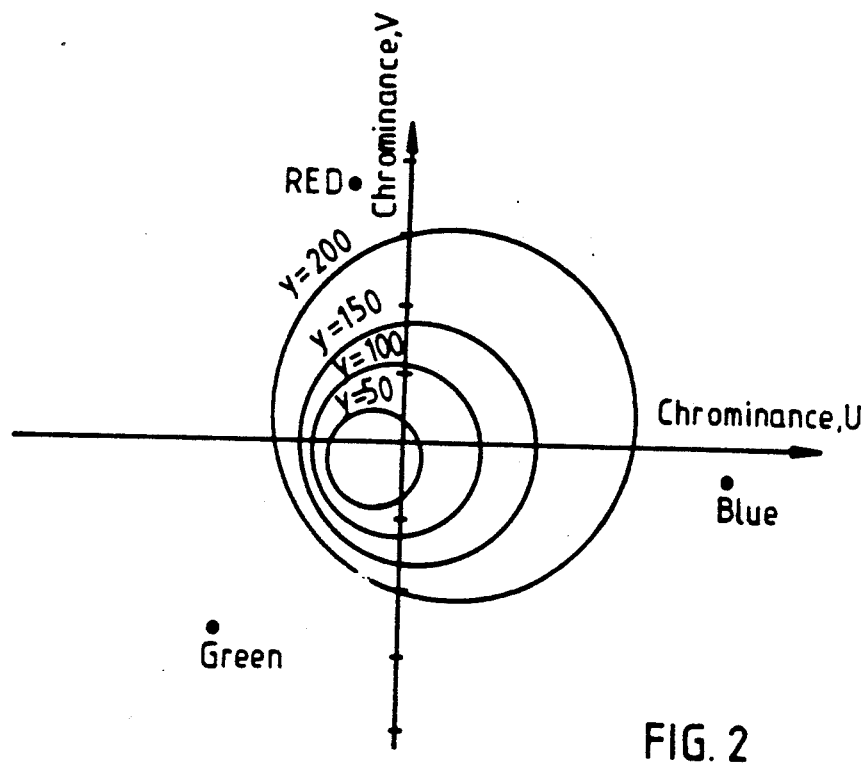
FIG. 2 is a plot of one chrominance parameter versus another showing a series of curves of constant luminance.

FIG. 2 shows the U,V chrominance plane and illustrates a set of curves of constant luminance. As seen in FIG. 2, regions of identical color saturation having the same luminance value Y are located on circles whose radii represent the respective color saturation values. In accordance with the linear relationship of equation 11, the radii of the circles increase in direct proportion to the luminance value Y. Per the preceding classification criteria based on threshold value, the color dominant regions for a given luminance value Y lie outside of the respective circle while the color nondominant regions which determine corrections in color casts are disposed inside the respective circle. The circles would normally be concentric about the gray point $U=0, V=0$. In FIG. 2, however, it is assumed that different color casts arise in different luminance intervals and that, during analysis of the various regions (differentiation between color dominant and color nondominant regions), the centers of the circles are shifted so as to permit analysis of a central area in each luminance interval about the expected average color cast $U_{oi}, V_{oi}$.

From the color nondominant regions defined in this manner, correction plots or curves for the primary colors red, green and blue are now established as follows:

An average or overall color cast $J_i, V_i$ is calculated for the color nondominant regions of each luminance interval i containing such regions by summing the corresponding chrominance values $U_{pi}, V_{pi}$. Thus:

$$U_i = \sum_p U_{pi}, \quad V_i = \sum_p V_{pi}$$

For each luminance interval, the overall color cast is then corrected in accordance with the gray equivalence principle by a shift towards the gray point ($U=0, V=0$). This is accomplished using equations 1 and 2, namely:

$$U_i + \Delta U_i = 0 \quad (1)$$

and $$V_i + \Delta V_i = 0 \quad (2)$$

Alternatively, it is possible to correct or adjust the overall color cast for each luminance interval by a shift towards a specific point $U_{gi}, V_{gi}$ which deviates from the gray point. In this case, equations 3 and 4 are used:

$$U_i + \Delta U_i = U_{gi} \quad (3)$$

and $$V_i + \Delta V_i = V_{gi} \quad (4)$$

Such an adjustment is employed when, in accordance with individual tastes and subjective aesthetic viewpoints, a "warmer" color temperature (shift towards yellow or red) or a "cooler" color temperature, for example, is preferred as opposed to gray balance When an adjustment of this type is made, the empirically determined values of $U_{gi}$ and $V_{gi}$ must be held in a table.

The luminance values $Y_{pi}$ for the respective luminance intervals remain unchanged upon correction or adjustment of the overall chrominance values $U_i, V_i$.

The original or uncorrected overall chrominance values $U_i, V_i$ and the corrected (shifted) overall chrominance values $U_i + \Delta U_i, V_i + \Delta V_i$, together with the luminance values $Y_{pi}$, are now converted back to red, green and blue density values using the following equations:

$$R_i = V_i + Y_{pi} \quad (12)$$

$$G_i = Y_{pi} - 0.5 V_i - 0.166 U_i \quad (13)$$

$$B_i = U_i + Y_{pi} \quad (14)$$

$$R_i' = (V_i + \Delta V_i) + Y_{pi} \quad (15)$$

$$G_i' = Y_{pi} - 0.5(V_i + \Delta V_i) - 0.166(U_i + \Delta U_i) \quad (16)$$

$$B_i' = (U_i + \Delta U_i) + Y_{pi} \quad (17)$$

Here, $R_i, G_i, B_i$ respectively denote uncorrected red, green and blue density values derived from the uncorrected chrominance values $U_i, V_i$ while $R_i', G_i', B_i'$ respectively denote corrected red, green and blue density values obtained from the corrected chrominance values $U_i + \Delta U_i, V_i + \Delta V_i$. Each uncorrected red density value $R_i$ is associated with a respective corrected red density value $R_i'$ to define a point on a plot of $R_i$ versus $R_i'$; each uncorrected green density $G_i$ is associated with a respective corrected green density value $G_i'$ to define a point on a plot of $G_i$ versus $G_i'$; and each uncorrected blue density value $B_i$ is associated with a respective corrected blue density value $B_i'$ to define a point on a plot of $B_i$ versus $B_i'$.

Figure 3:
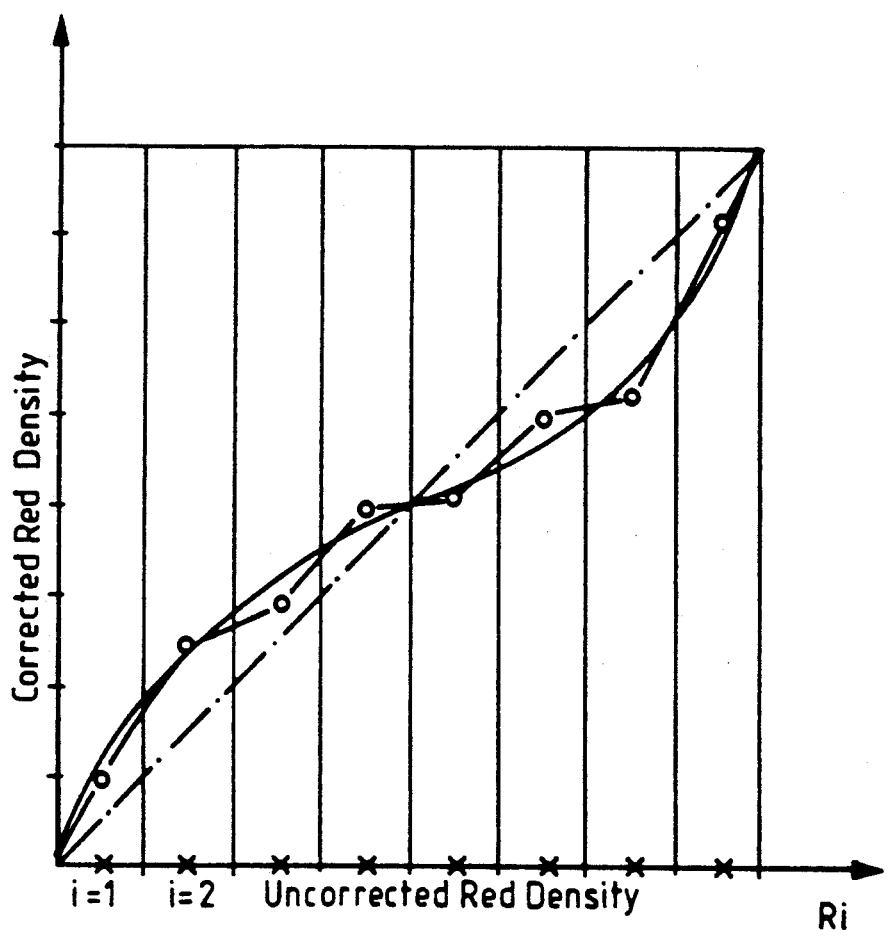
FIG. 3 is a plot of uncorrected color density versus corrected color density showing the development of a correction curve.

A correction plot or curve, preferably in Cartesian coordinates, is established for each primary color using the uncorrected and corrected density values for the respective color. FIG. 3, which shows the $R_i, R_i'$ plane, illustrates the development of a correction plot or curve $R_i' = f(R_i)$ for the color red.

For each luminance interval i, the original or uncorrected red density value $R_i$ (denoted by x), which corresponds to an overall color cast $U_i, V_i$ for the interval, is associated with a new, corrected red density value $R_i'$ (see the points o). Connecting the points o with one another yields a plot in the form of a series of connected straight line segments This segmented plot can be transformed into a continuous curve by means of conventional mathematical smoothing algorithms. For instance, in one conventional method of smoothing a segmented plot, each point of the segmented plot is assigned a point $P_n$ on a plot representing an approximation of a final smooth curve and a new point is then established. The new point is located midway between the original point $P_n$ and the center of the line connecting the points $P_n 31\ 1$ and $P_n + 1$. This procedure can be repeated a number of times (iteration) until a smooth curve such as the inverted S-shaped curve of FIG. 3 is obtained.

FIG. 3 further illustrates the 45° line $R_i' = R_i$. A comparison of this line with the inverted S-shaped curve shows that $R_i' < R_i$ in the upper portion of the curve corresponding to high luminance of the image. On the other hand, $R_i' > R_i$ in the lower portion of the inverted S-shaped curve corresponding to low luminance of the image. This means that a shift towards red must take place where luminance of the image is lower while the proportion of red must be decreased where luminance of the image is higher. It thus becomes clear how different color casts at different luminances are compensated for individually.

Figure 4:
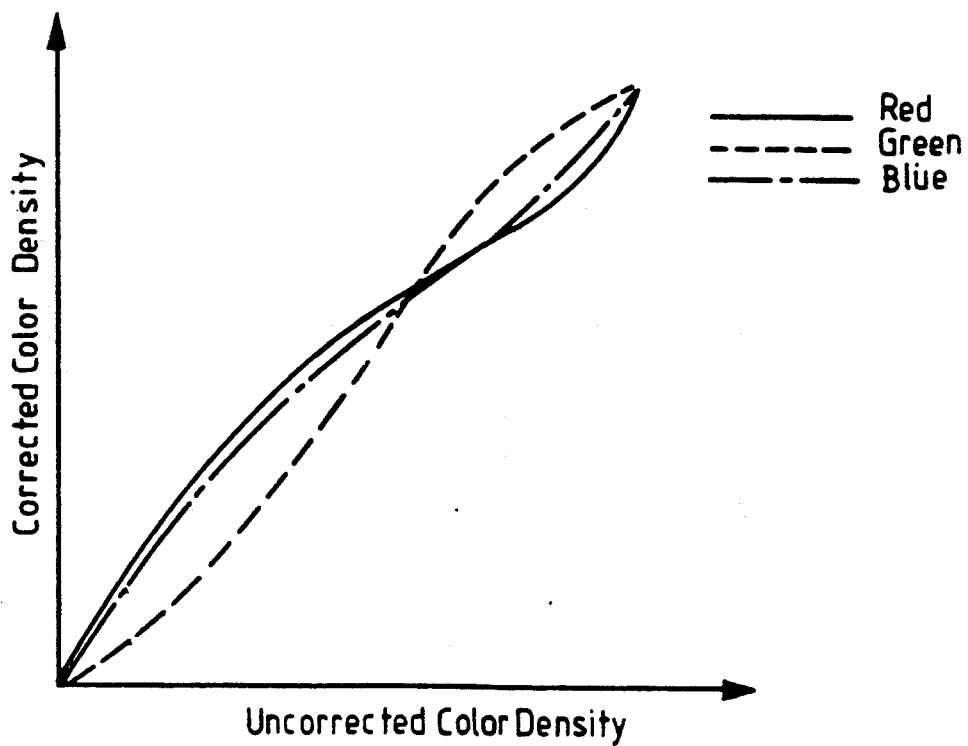
FIG. 4 is a plot of uncorrected color density versus corrected color density showing three distinct correction curves for the primary colors red, green and blue, respectively.

As illustrated in FIG. 4, a correction curve is obtained for each of the three primary colors red, green and blue. Each of the correction curves increases monotonically with increasing luminance value.

Referring back to FIG. 1, the red, green and blue density signals generated by the scanner 1 are transmitted along respective red, green and blue color channels to a printer 7 which issues a reproduction of the electrooptical image derived from the scanner 1. During transmission, the density signals are processed and such processing includes correcting the density signals for color casts. In practice, the corrections are carried out by loading the data for each correction curve into an individual look-up table 5 which is associated with the respective color channel and is located in the path of the corresponding density signals.

As mentioned earlier, the red, green and blue density signals generated by the scanner 1 are digitized and the resulting stream of digitized signals is divided between the memory 2 and the data averaging unit 3. The digitized red, green and blue density signals leave the memory 2 along the respective red, green and blue color channels and are forwarded to the corresponding look-up tables 5. The digitized density signals are modified by the look-up tables 5 in the manner outlined above with the density signals for each primary color being modified separately from the density signals for the other primary colors. Thus, the look-up table 5 associated with the red color channel modifies the red density signals; the look-up table 5 associated with the green color channel modifies the green density signals; and the look-up table 5 associated with the blue color channel modifies the blue density signals. From the look-up tables 5, the modified density signals are transmitted to a memory 6 for temporary storage. The modified density signals, which represent the electrooptical image obtained from the scanner 1 as corrected for color casts, are retrieved from the memory 6 by the printer 7 which then records the image, e.g., on color paper.

The procedure outlined above can be used for the automatic correction of color casts. This procedure is capable of eliminating not only global or overall color casts but, to the extent that the individual luminance intervals are associated with appropriate regions of the original 8, i.e., to the extent that the original 8 contains regions which are nearly gray, the previously mentioned "color imbalances" as well. If there are no nearly gray regions associated with a particular luminance interval, then no correction is performed in such interval. However, due to the smoothing of the correction plots described above, a correction is carried out in the next highest luminance interval. In contrast, during global or overall correction of color casts according to the prior art, color correction is performed for all intervals even when there are intervals which are not associated with nearly gray regions. On the other hand, if all or most of the luminance intervals are associated with nearly gray regions, a situation can arise in which the overall color casts for the individual intervals compensate for one another in such a manner that no adjustment of the color temperature is required for global or overall correction of color casts. By combining global or overall color correction with luminance-dependent color correction, the advantages of both types of correction can be combined. Thus, correction of a color cast can be achieved even in the absence of nearly gray regions while luminance-dependent "color imbalances" can also be corrected.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of preparing an image of an original, comprising the steps of scanning said original in each of the primary colors red, green and blue; generating a luminance value and at least one related chrominance value for each of a multiplicity of regions of said original based on the scanning step, said luminance values spanning of predetermined range; dividing said range into a plurality of segments so that different ones of said luminance and chrominance values lie within different segments; classifying the regions having luminance and chrominance values within said segments as color dominant or color nondominant; calculating at least one representative value for each of selected segments based on corresponding chrominance values, the calculating step including assigning different weights to dominant and nondominant regions in such a manner that the representative value for each selected segment represents an overall color cast for selected regions of the respective segment; adjusting each of said of said representative values with reference to the gray point to generate a respective adjusted value; and establishing a correction plot for each of the primary colors based on the pairs of representative and adjusted values.

2. The method of claim 1, wherein the scanning step is performed electrooptically.

3. The method of claim 1, wherein the scanning step comprises scanning said original at a multiplicity of points defining a series of N rows and M columns, the generating step including generating red, green and blue density values for each of said points, dividing said points into groups each of which corresponds to one of said regions, and respectively averaging the red, green and blue density values for each of said groups to derive average red, green and blue density values for each of said regions.

4. The method of claim 3, wherein the point dividing step comprises dividing said points into a series of n rows and m columns per group where n is smaller than N and m is smaller than M.

5. The method of claim 3, wherein the generating step comprises converting the average red, green and blue density values for each group into a luminance value and a pair of chrominance values.

6. The method of claim 1, wherein the classifying step comprises determining a region color saturation value for each of said regions and employing a threshold value with each of said saturation values, the threshold value for each region being a function of a luminance value of the respective segment.

7. The method of claim 1, wherein the generating step comprises generating a first and a second chrominance value for each region, the calculating step for each selected segment comprising summing the first chrominance values of the respective regions susceptible to color casts to obtain a first sum and summing the second chrominance values of the respective regions susceptible to color casts to obtain a second sum.

8. The method of claim 7, wherein the adjusting step comprises shifting said first and second sums towards the gray point or towards a predetermined color which deviates from the gray point.

9. The method of claim 1, wherein the generating step comprises generating red, green and blue density values for each of said regions and converting the density values for each region into luminance and chrominance values, the calculating step including calculating overall chrominance values for the selected segments and the adjusting step including adjusting the overall chrominance values to generate adjusted chrominance values; and further comprising the steps of converting the overall chrominance values into unadjusted red, green and blue density values, and converting the adjusted chrominance values into adjusted red, green and blue density values, the steps of converting the chrominance values being performed subsequent to the adjusting step and prior to the establishing step, and the establishing step including making plots of unadjusted density value versus adjusted density value for each of the primary colors.

10. The method of claim 1, wherein each of said plots comprises a series of connected straight line segments or a monotonically increasing curve.

11. The method of claim 1, further comprising the step of separately storing data for each of said plots.

12. The method of claim 1, wherein the scanning step comprises scanning said original at a multiplicity of points and the generating step comprises generating red, green and blue density values for each of said points; and further comprising the step of correcting said red, green and blue density values using the respective plots.

13. The method of claim 1, wherein the classifying step comprises determining a regions color saturation value for each of said regions and comparing each saturation value with a threshold value, the threshold value for each region being a function of a luminance value of the respective segment.

14. The method of claim 13, wherein the classifying step comprises assigning different threshold values to said segments in such a manner that threshold value increases monotonically with increasing luminance value.

15. The method of claim 14, further comprising the step of storing said threshold values.

16. The method of claim 14, wherein said threshold values are assigned in accordance with the equation $$S_{ti} \leq k_0 + (k_1 \times Y_{pi})$$

where $S_{ti}$ represents threshold value for the ith segment, $Y_{pi}$ represents luminance value for the ith segment, $k_0$ is a constant such that $10 \leq k_0 \leq 20$ and $k_1$ is a constant such that $0.05 \leq k_1 \leq 0.15$.

17. The method of claim 1, wherein each of said plots comprises a series of connected straight line segments; and further comprising the step of smoothing said plots.

18. An apparatus for preparing an image of an original, comprising means for scanning the original in the three primary colors red, green and blue; and data processing means operatively associated with said scanning means and including means for generating a luminance value and at least one related chrominance value for each of a multiplicity of regions of the original with resulting establishment of a predetermined range of luminance values, means for dividing the predetermined range into a plurality of segments such that different ones of said luminance and chrominance values lie in different segments, means for classifying the regions having luminance and chrominance values within the segments as color dominant or color nondominant, means for calculating at least one representative value for each of selected segments based on corresponding chrominance values by assigning different weights to dominant and nondominant regions in such a manner that each representative value represents an overall color cast for selected regions of the respective segment, means for adjusting each representative value with reference to the gray point so as to generate a respective adjusted value, and means for establishing a correction plot for each of the primary colors from the paris of representative and adjusted values.

19. The apparatus of claim 18, further comprising respective storage means for the different plots.

20. The apparatus of claim 18, wherein said scanning means comprises means for scanning the original at a multiplicity of points and means for generating red, green and blue density signals for each point; and further comprising means for correcting the red, green and blue density signals based on the respective pots and on the luminances of the respective points.

* * * * *